Nov. 8, 1955     N. P. HARSHBERGER     2,722,868
APPARATUS FOR MANUFACTURING A COMPOSITION MATERIAL
Filed Oct. 3, 1950     4 Sheets-Sheet 1
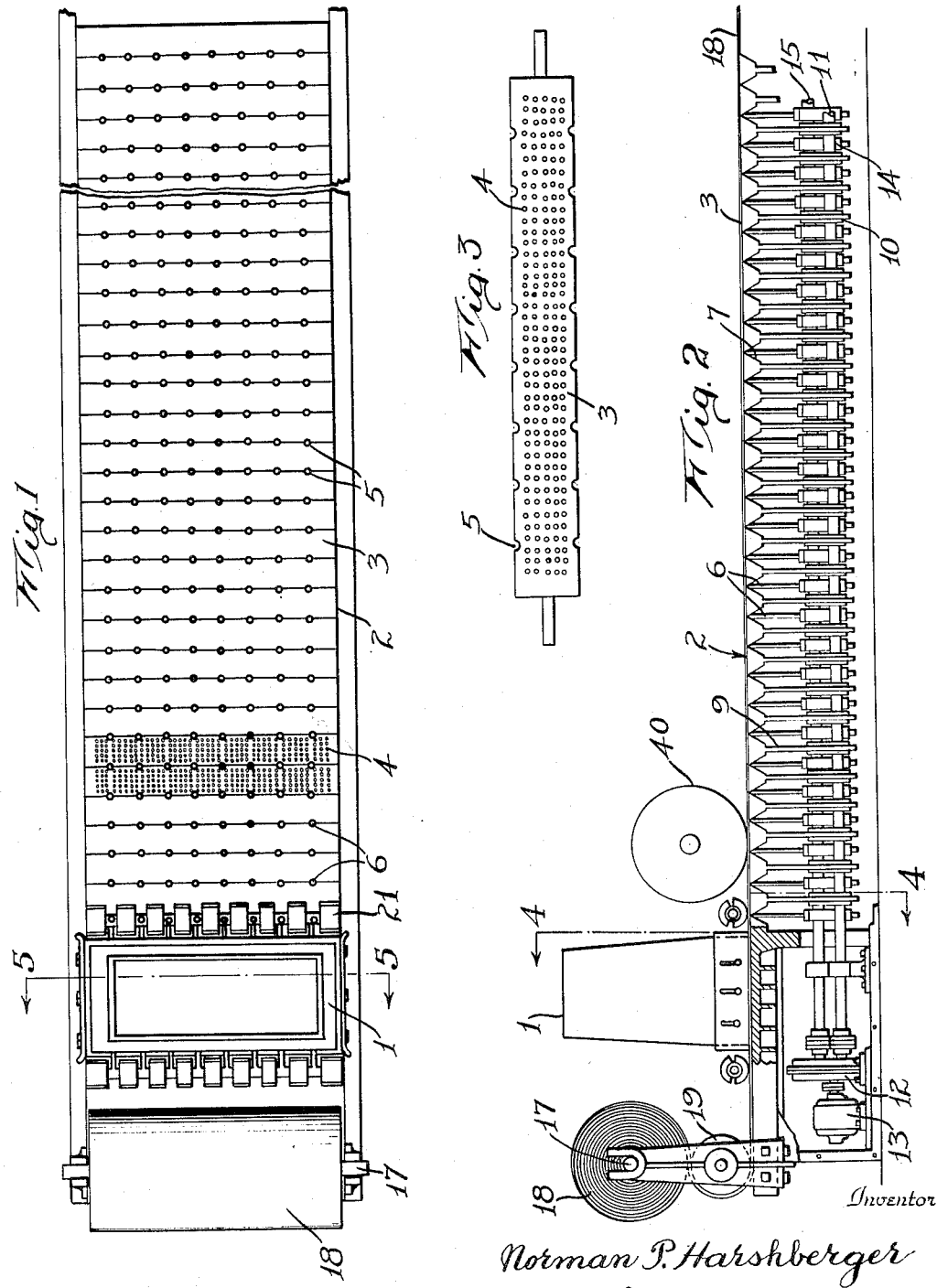
Inventor
Norman P. Harshberger
By Wilfred Lawson
Attorneys

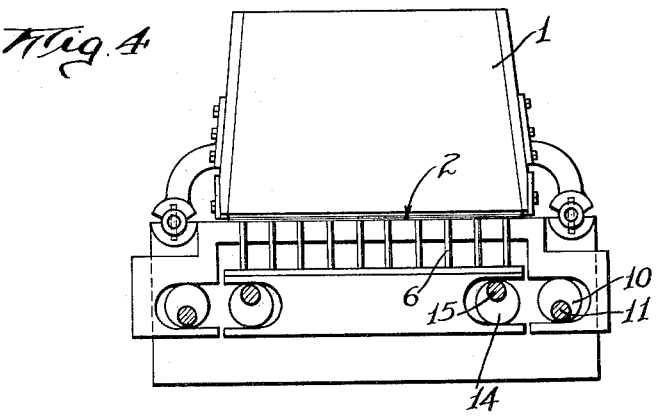
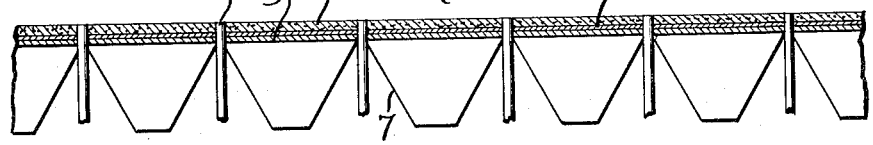
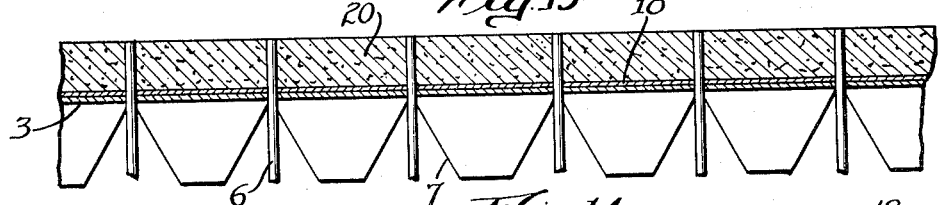
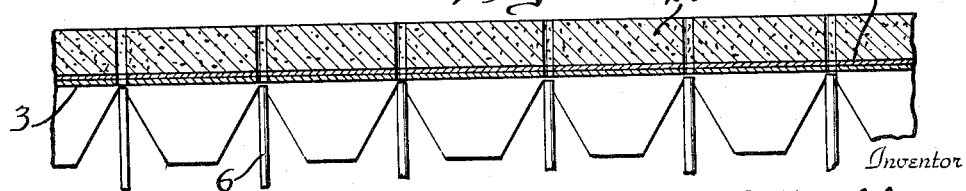
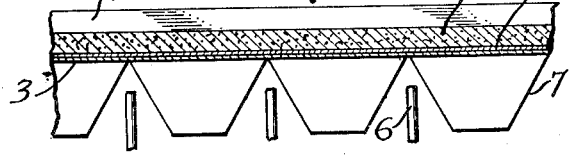

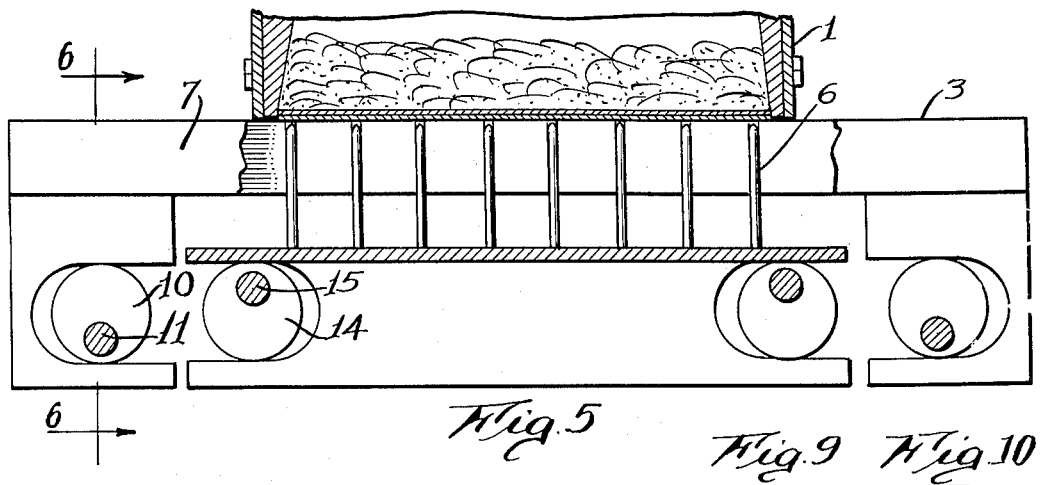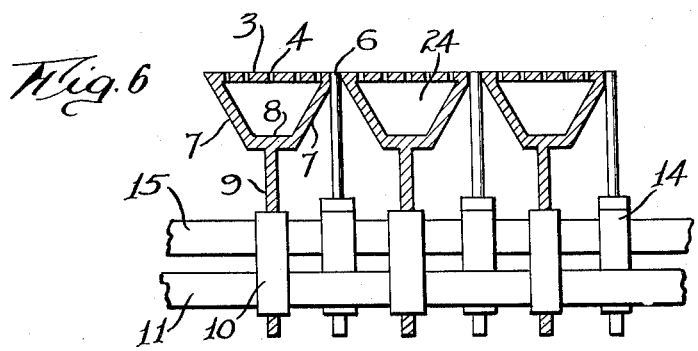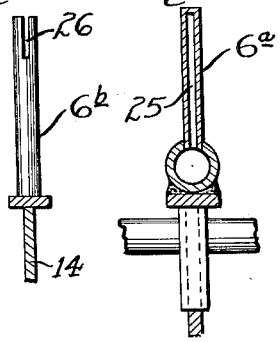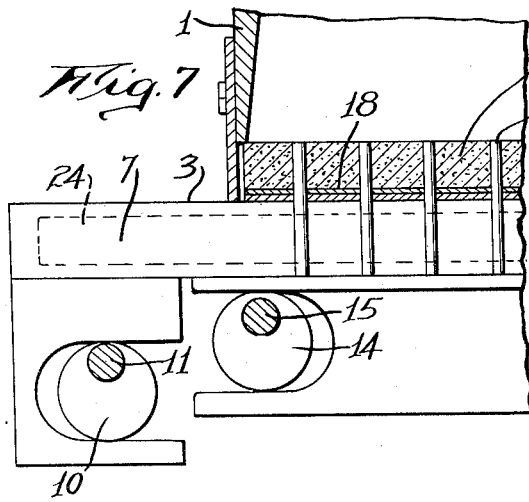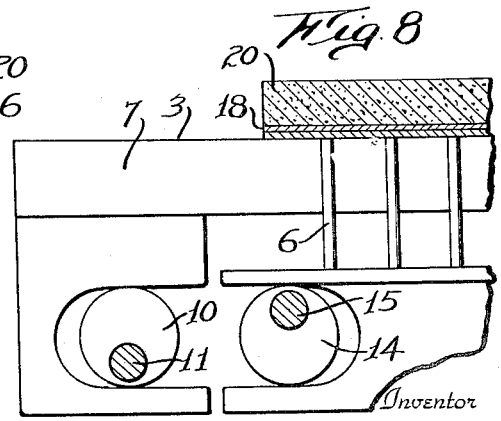

Nov. 8, 1955        N. P. HARSHBERGER       2,722,868
APPARATUS FOR MANUFACTURING A COMPOSITION MATERIAL
Filed Oct. 3, 1950        4 Sheets-Sheet 4
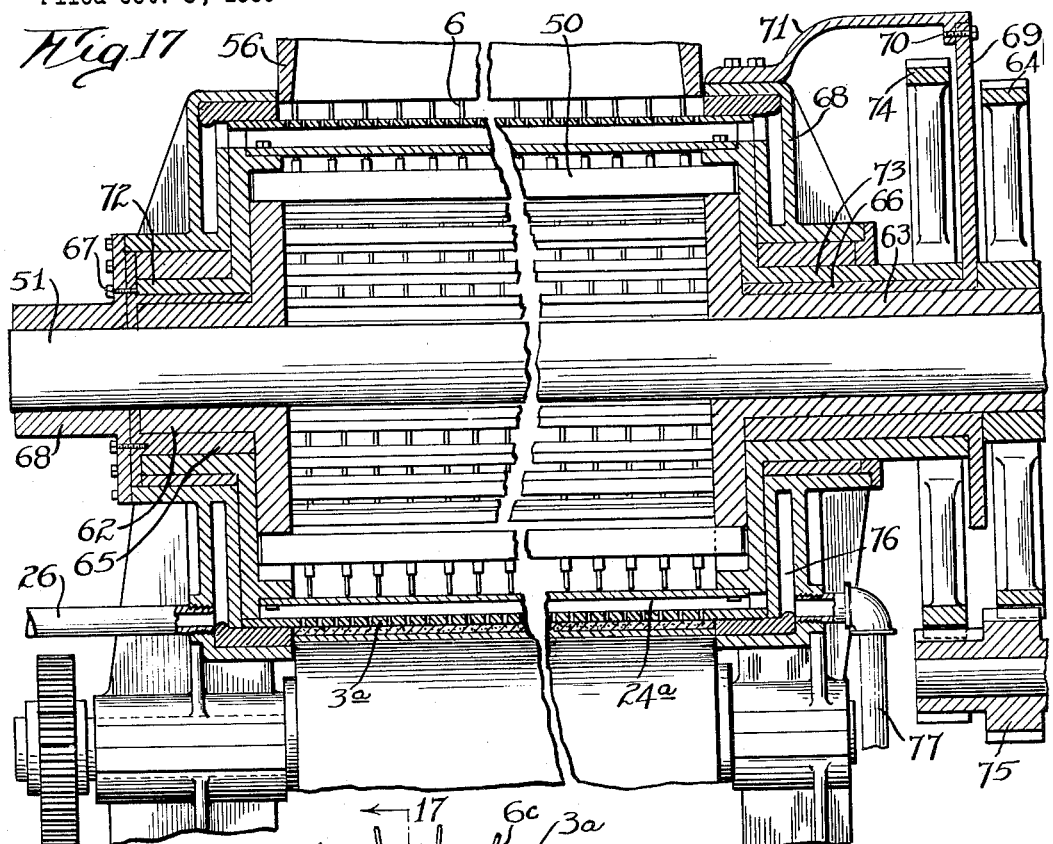
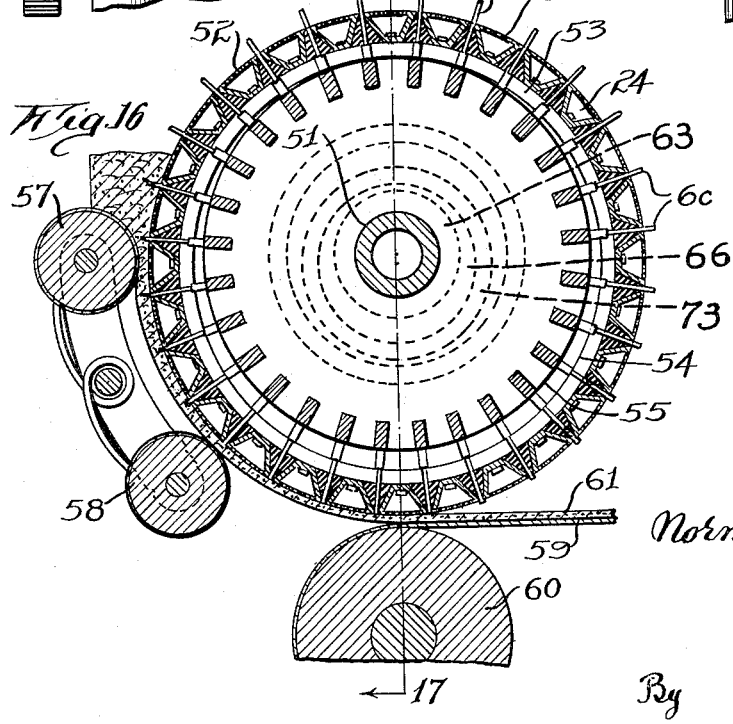
Inventor
Norman P. Harshberger
By      Attorneys

United States Patent Office 2,722,868
Patented Nov. 8, 1955

2,722,868

APPARATUS FOR MANUFACTURING A COMPOSITION MATERIAL

Norman P. Harshberger, Pasadena, Calif.

Application October 3, 1950, Serial No. 188,168

13 Claims. (Cl. 92—38)

My invention relates to a method and apparatus for forming a composition material, and more particularly to a method and apparatus for forming paperboard, wallboard, panels faced with aluminum or other metals, fabrics, paper or a combination thereof and forming therebetween pulpy masses of wet or relatively dry materials formed of long or short fibres of organic or inorganic materials, or in fact any particulate particles (fibrous or otherwise) and binders. For simplification only the term "sheet" is used to describe all forms of end products that can be formed by the method and apparatus.

By the conventional wet methods heretofore employed for the making of paper, wallboards, and the like, a large volume of water to that of solids is employed, and in fact is a medium by which the lay of the fibre is controlled. Fourdrinier machines, which by vacuum draw thereon pulpy masses, are examples of machines conventionally employed in formation of said products. While the method and apparatus embodying my invention will make a very wet product similar to the Fourdrinier machines, it will also make products that are formed from relatively dry or sticky masses, which would be impossible to form on conventional equipment.

In general my method and apparatus comprises distributing wet or relatively dry pulp on a drum or table from which extend pins. The base of the table surrounding the pins is movable or the pins are movable in relation to the table, or to drum surface through which they project. The term "pins" in my invention is used for simplification, and in describing the function of my method and apparatus it is to be understood that the term includes projecting members of any desired dimension or shape, or bars running the full width of the machine with the bed plates acting as spacers therebetween.

Attached to the hopper are trowels or shoe-shaped plates to pack down or orient the material upon the bed plates. A pressure roller can be moved over the bed or drum to compress the wet or relatively dry material placed thereon. When a pressure roller is used, the pins may be withdrawn from the pulp or the bed plates raised to a point substantially level with the top of the pins, or if desired the roller may be in segments and travel between the pins while the pins remain at one or more levels.

In one form of my invention the process is continuous, and the composition material manufactured by this method and apparatus comes from the apparatus in a continuous strip. It is an advantage of my invention that there can be a continuous process without shutting down the apparatus while one sheet of finished material is removed. In the other form of my invention only single sheets are manufactured and are removed from the machine before a second sheet is formed.

One of the objects and advantages of my invention is that any type of pulp can be used thereon without the addition of excessive amounts of water, therefore speeding up the time necessary for the manufacture of the composition material. In fact, even dry particulate material (fibrous or otherwise) can be used.

A further object of my invention is in providing a method and apparatus for manufacturing a composition material from either a comparatively dry pulp or one that is tacky, sticky or gummy, or ordinarily difficult to handle. Thus by my method of withdrawing fluids from or otherwise treating the product formed, I am able to substantially speed up the operation, avoiding the necessity of long drying tunnels or special drying facilities. The pressed fibres or other particulate materials are effectively handled as oriented over and around the pins. It is to be understood that certain formulations may be handled by first laying upon the bed plate all the material forming the product and then to force the pins through to the desired depth while applying pressure opposite to the direction of travel of the pins for the purposes of injecting or withdrawing fluids therefrom. Even after withdrawal of the pins from the product the voids left by the pins afford the means to circulate the fluids into the interior of the product.

Another object and advantage of my invention is that progressive drying of layers of pulp, or of a monolithic formation of pulp, is assured. The pulp may be formed into the finished material in layers each being partially, or completely dried before another layer is applied; or a monolithic thick mass may be trowelled or otherwise applied thereon.

Another object of my invention is that the machine ejects the finished material before or after impregnating drying and/or cooling by in one instance raising the bed plates or in the other by withdrawing the pins.

In all the figures of the drawings openings are shown for withdrawal or injection of fluids (either in the bed plates or pins) and the term "fluids" shall be interpreted as solids that may be made fluid, as well as liquids and gases.

In the conventional paper or board forming methods it is the tendency of the fibre to take a position parallel to the bed over which it is drawn. To that extent the same is true of my method. However, instead of being limited by the thickness of the board so that fluid may readily be drawn therethrough as in conventional methods, I provide a means for passing fluids in all directions, thereby greatly facilitating the treatment of the product.

As old as the art of paper making is, never to my knowledge has a fluid been withdrawn or injected in the general plane of the faces of the board. Passing fluids to or from the product in the same direction as the fibre lay rather than transverse to the general plane, is a very important feature of my invention whether the product formed is monolithic or laminated. By choice of spacing the pins as to the area of the product, the fibre may be acted upon at the spaced intervals of the pins thereby effectively treating the whole mass of the product without having to force through or withdraw fluids transverse of the fibre lay. Due to the variables in the filtering value of many materials of which my method and process permits the use, it is often necessary to have endwise passage of fluids through the material forming the products. By this method the fluid flow is materially enhanced and affords the formation of wall panels six inches or more in thickness, and at a production cost far below that which is possible by following the prior art.

Other objects and advantages will be apparent from the following description of the preferred forms thereof.

In the drawings:

Figure 1 is a plan view of the apparatus comprising my invention.

Figure 2 is a side elevation.

Figure 3 is a top view of one of the bed plates used in my invention.

Figure 4 is a cross-section taken on the line 4—4 of Figure 2.

Figure 5 is an enlarged cross-section taken on the line 5—5 of Figure 1.

Figure 6 is an enlarged cross-section taken on the line 6—6 of Figure 5.

Figure 7 is an enlarged cross-section similar to Figure 5 showing the pins and bed plate in different positions.

Figure 8 is a partial cross-section similar to Figure 7 showing the pins in an extreme lowered position, but the bed plates fully raised, lifting the completed material clear of the pins and ready for removal.

Figure 9 is a side elevation of a pin.

Figure 10 is a view in longitudinal section of a modified type of pin.

Figure 11 is a cross-section showing one stage in the process of producing the composition material.

Figure 12 is a cross-section showing the second step in my process.

Figure 13 is a cross-section showing a third step in my process.

Figure 14 is a cross-section showing a fourth step in my process. (Note: A reversal in the order of plate and pin may be used, where the material is laid while the pins are up, then progressively lowered as pressure is applied to material.)

Figure 15 is a cross-section showing a fifth step where pressure is applied to the web with pins entirely withdrawn.

Figure 16 is a cross-section of a modified form of the apparatus for carrying out my invention, said form being a continuous apparatus.

Figure 17 is a cross-section taken on the line 17—17 of Figure 16.

In the non-continuous form of my invention I provide a hopper 1 for reception of wet or relatively dry fibre, or pulp of any type, which moves laterally along the length of a table 2. The table 2 is formed of a series of bed plates 3; each of these bed plates is formed, as shown in Figure 3, as a continuous strip extending across the table 2 and having therein holes 4 for water to drain off or be removed by suction from the mass of pulp to be applied to the table. Extending through the slots 5, which form holes in the table, are pins 6. The bed plates 3 are carried by walls 7, which extend to the edges of the bed plates and taper inwardly toward each other and connect with a plate 8 which has a connecting rod 9 attached which rides on and is supported by a cam 10 carried by a longitudinal shaft 11 running parallel to the table 2. The shaft 11 is connected through a gear box 12 to an electric motor or other prime mover 13.

The pins 6 rest on and are supported by a cam 14 carried by a shaft 15 running the length of the table 2, which in turn is connected through the gear box 12 to the prime mover 13. However, either the pins 6 or the bed plates 3 can be affixed directly to a bed plate in a stationary position. The gear box 12 has an internal arrangement whereby the cams 10 and 14 can be rotated independently of each other. Either cam can rotate or remain stationary. It is not necessary to have both the bed plates and pins movable, and either one or the other can be fixed permanently in position.

In the operation of my device both the bed plates 3 and the pins 6 are raised to their extreme position so that the ends of the pins are leveled with the top surface of the bed plates. At the end of the table is a roll 17 upon which is a supply of aluminum, or in fact any metal, paper, glass cloth, asbestos cloth, cotton canvas, waterproof paper, wire cloth, or other reticulated material 18, which runs down under the idler roll 19 and is drawn out flat along the top of the table 2 underneath the hopper 1. This operation is shown in Figure 11.

After the paper has been moved the length of the table the motor 13 is actuated to cause the bed plates 3 to move downwardly in relation to the pins 6. The hopper 1 is then moved the length of the table 2, and progressively the pins 6 perforate the paper while the hopper is depositing thereon a layer of pulp 20. The pins 6 act as a drag to orient the fibres of the pulp in the direction of travel of the hopper and to prevent sliding of the mass upon the table. The shoes 21, which are spaced to pass the pins 6, trowel this pulp into position and lay it evenly on the bed plates 3 as well as hold down the paper as the pins 6 pass through. The shoes are arranged to move with the change of calibrations of material as laid by the hopper or may be held at one or more fixed points. The face of the hopper wall itself may move up and down and may be slotted to pass the pins 6. The term "pulp" is used for convenience in describing the process and function of the apparatus, though all fibre, comminuted material (synthetic or natural), long or short fibre, wet or dry, coarse or fine, or in combination with other particulate materials, is contemplated where the term "pulp" is used.

As shown in Figure 12, a thin layer of pulp 20 is applied and trowelled evenly over the bed plates 3. With certain pulp formulations and if the full thickness of the composition material were formed before dissipating the water or other fluids, considerable difficulty would be encountered; and the rate of filtration of the fluids through the material would be out of proportion for that justified for commercial operation. Of course, if a very thin sheet is desired it can be applied in one operation. Density of material, fineness of subdivision, physical properties of the material, wetting properties, and filtering qualities of the formed material alter this operation considerably. When one layer of pulp is deposited by the hopper 1 on the bed plates 3, the bed plates are further lowered in relation to the pins 6 and a second or third layer is deposited until the final board is as shown in Figure 13. At this time the pins 6 are withdrawn to a level below that of the bed plates 3 and a roller 40 may or may not be moved along the table compressing the pulp as may be desired, or a pressure plate 23, as shown in Figure 15, is applied. At this point the pressure plate may serve as a partial fluid seal while vacuum and pressure are applied to the product. The pressure plate may be perforated or shaped for making designs and increasing density of only portions of the product 20.

After the pressure plate has compressed the materials or otherwise acted as a seal and pressed the materials to the desired thickness, the product can be easily removed from the table 2 by raising the bed plates 3 to their original position flush with the ends of the pins 6 and lifting the plate.

In some types of material it is desirable to leave holes for acoustical or other purposes. When this type of material is formed the pins 6 are only lowered to a point above the bed plates 3 to which it is desired to compress the composition material by the roller 40 or the pressure plate 23.

To facilitate the removal of liquid from the pulp and the drying of the same the bed plates 3 have a passage 24 through their centers which can be connected to a suction pump to draw out the liquid in the pulp through holes 4. The same holes 4 may also be utilized to force a fluid through the product while it is being formed. Also the pins can be formed as indicated at 6a, in Figure 10, with a core or conduit 25 which may have, if desired, perforated walls or a straight or slightly tapered smooth tube with an open end. These pins may be of any size or shape; for example, such as shown in Figure 10. The passage 24, core or conduit 25 can be connected to a steam line for the passage of a hot vapor or for a cold fluid supply or may be connected to a vacuum line to hasten removal of liquids or fluids from the product. In some cases it becomes necessary to inject fluids for purposes of cleaning the conduit by alternating the direction of flow of the fluid at various positions of the pins. Pressure may be applied by fluid forced against the product for removal from the bed plates.

In Figure 9 is shown a modified form of pin, designated 6b, having in its upper end a groove 26 for the reception of re-enforcing material such as wire or rods not shown. These rods can be under stress (prestressed) and may be run either crosswise or lengthwise of the table 2, and the pulp packed around them. The term "rods or wire" contemplates the use of non-metallic materials such as wood strips, cord or treated fibre board, as well as metallic materials. If desired the rods or wire may be placed lengthwise or transverse or in both directions at the same time between the rows of pins.

In Figures 16 and 17 I illustrate a machine for continuous forming of a composition material. In this form of my invention the pins 6c are mounted upon a drum 50 which is journalled to rotate on a central shaft 51. Bed plates 3a are similar to those in the non-continuous form except that they have their outer surface 52 as segments of a circle. The bed plates 3a are mounted on a drum 53. The drum 53 is mounted to rotate on a center 54 slightly off center from the center 55 of the shaft 51. By so positioning the drums the pins 6c extend through the bed plates 3a at the top of the drums and a hopper 56 is there positioned to feed pulp onto the outer surface of the bed plates 3a. Shoes similar to those used in the non-continuous form are used for troweling or otherwise orienting the pulp onto the bed plates 3a. The term "shoes" shall include pronged comb-like members which more than affect just the surface. The drums 50 and 53 are caused to rotate simultaneously in a counterclockwise direction (Fig. 16), and the pressure roll 57 compresses the pulp. An embossing roll 58 may be used for forming water marks or other marks in the pulp. As the drums are not mounted concentrically and rotate simultaneously in a counterclockwise direction, the pins are retracted through the bed plates when the drums are rotated to the lowermost position. A conveyor belt 59 carried by the roller 60 and other rollers removes the composition material 61, formed by the drums and pressure rolls, in a continuous sheet.

To mount the drum 53 on the center 54, which does not coincide with the center 55, the shaft 51 has sleeves 62 and 63 extending therefrom. The sleeve 62 acts as a bearing at one end of the drum and the sleeve 63 acts as a bearing and a connecting means to connect the same to gear 64. Journalled to permit rotation of the sleeves 62 and 63 are the cam sleeves 65 and 66. These sleeves 65 and 66 are mounted with the center of their inner-bores concentric and their outer surface following a circle which has its center concentric with the center 54. To maintain these cam sleeves 65 and 66 in position and to prevent their rotating, the cam sleeve 65 is bolted at 67 to the main frame 68 and the cam sleeve 66 has a flange 69 which is bolted at 70 to an arm 71 bolted to the main frame 68. The drum 53 has the sleeves 72 and 73, which are journalled to rotate upon the cam sleeves 66. The sleeve 73 has a gear 74 at its exterior end. A gear box 75, connected to a prime mover, drives the gears 74 and 64 at a constant speed so that the drums 50 and 53 are rotated through an identical number of degrees at the same time.

The term "hopper" is to include broadly a means for spreading the pulp. A fountain of materials, being a broad term for supplying the substances to the pins and bed plates or the fabric laid thereover, is anticipated in this definition.

To provide a means of quickly withdrawing the water from the pulp and for drying the same, the bed plates 3 have their central passages 24 connected through passages 76 and pipes 77 to a suction device to draw off the moisture from the pulp to hasten its drying. If it is desired, the passages 24 could be connected by the pipe 77 to steam or hot air, or to pressure equipment for injecting binders such as fluid, resins, gases, etc.

While I have described the preferred embodiments of my invention, I am not limited to any of the details set forth herein, except as described in the appended claims.

I claim:

1. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates.

2. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates, said bed plates formed in the shape of a conduit, and holes in the upper surface of said bed plates whereby the water in said pulp can be drawn off through said bed plates.

3. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates, and means carried by and attached to said bed plates for removing the water from said pulp.

4. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates, and said pins having means for heating said pulp to accelerate the drying.

5. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates, said bed plates formed in the shape of a conduit, and holes in the upper surface of said bed plates whereby the water in said pulp can be drawn off through said bed plates, and said pins having means for heating said pulp to accelerate the drying.

6. In a machine for producing composition material, a table composed of a series of bed plates, said bed plates having interstices for the reception of pins, pins mounted to pass through said interstices to act as a drag and to orient the fibres of pulp, a hopper mounted to move longitudinally on said table and to deposit pulp thereon, means for moving said bed plates in relation to said pins whereby said pins can be lowered in respect to said bed plates, and means carried by and attached to said bed plates for removing the water from said pulp, and said pins having means for heating said pulp to accelerate the drying.

7. A machine for producing a composition material comprising an elongate hollow bed having an upper apertured surface upon which a layer of pulp is to be placed, pins mounted for movement through the bed and layer thereon, means for moving the pins through the bed and said layer, said pins when within the layer of pulp acting as a drag and to orient the fibres of said pulp, and means for moving the bed independently of and along the pins to remove the pins from the layer, said hollow bed providing a chamber through which fluid can be caused to pass through the bed apertures.

8. A machine for producing a composition material including a bed having up and down movement and upon which a layer of pulp is to be placed selectively, said bed being hollow and having an upper apertured surface, means for moving the bed up or down, pins supported below the bed for up and down movement, said pins when raised extending through and above the bed through the layer thereon, means for raising and lowering the pins, said pins when disposed through the layer serving as a drag and to orient the fibres of said pulp, means for moving the bed along the pins to remove the pins from the layer, and fluid flow producing means in fluid communication with the interior of the hollow bed by which fluid flow can be established through said apertures.

9. A machine for producing a composition material including a bed to receive a layer of pulp, said bed being hollow and having openings for the passage of pins therethrough, pins supported below the bed for movement through the openings of the bed and through the layer thereon to act as a drag and orient the fibres of the pulp, said bed and pins being movable in relation to each other whereby said pins can be withdrawn from the layer to permit compression and removal, said bed having an upper apertured surface receiving the layer of pulp.

10. A machine for producing a composition material including an elongate bed having a surface to receive a layer of pulp, said bed having openings for the passage of pins therethrough, pins supported below the bed for movement through the openings of the bed and through the layer thereon to act as a drag and orient the fibres of the pulp, said bed and pins being separately movable in relation to each other whereby said pins can be withdrawn from the layer to permit compression and removal, means movable over and lengthwise of the bed for depositing a pulp layer thereon, means for moving the pins in a direction perpendicular to said surface, and other means for moving the bed in the direction of and simultaneously with the movement of the pins.

11. In a machine for producing composition sheet material, an elongate bed comprising a plurality of elongate plates disposed in side by side relation transversely of the length of the bed and upon which material is deposited for the formation of the sheet, said plates having matching edge recesses forming openings in the bed, means supporting the plates at their ends for effecting the raising and lowering of the plates, means for actuating the plate supporting means, a plurality of groups of pins supported vertically beneath the bed, each pin of the group being in position to pass vertically through a bed opening, means supporting each group of pins, and means for raising and lowering each supported group.

12. The invention according to claim 11, wherein said plate supporting means comprises a pair of cams for each plate and the means for actuating the plate supporting cams comprises a pair of driven shafts each carrying the plate supporting cams on one longitudinal side of the bed.

13. The invention according to claim 11, wherein each of said plates has a plurality of apertures therethru, and means forming a chamber below each apertured plate, said chamber providing means by which fluid may be caused to move through the plate apertures.

References Cited in the file of this patent

UNITED STATES PATENTS

| | | |
|---|---|---|
| 483,486 | Scott | Sept. 27, 1892 |
| 1,451,229 | Loudenslager | Apr. 10, 1923 |
| 1,593,792 | Caldwell | July 27, 1926 |
| 1,652,381 | Straub | Dec. 13, 1927 |
| 1,890,634 | Wenzel | Dec. 13, 1932 |
| 1,926,319 | Timmerman | Sept. 12, 1933 |
| 2,102,004 | Hutchins | Dec. 14, 1937 |
| 2,238,698 | Knaust | Apr. 15, 1941 |
| 2,310,457 | Owen | Feb. 9, 1943 |
| 2,341,499 | Cunningham | Feb. 8, 1944 |
| 2,370,393 | Brubacher | Feb. 27, 1945 |
| 2,383,736 | Rembert | Aug. 28, 1945 |
| 2,416,680 | Curtis | Mar. 4, 1947 |